Figure 1:
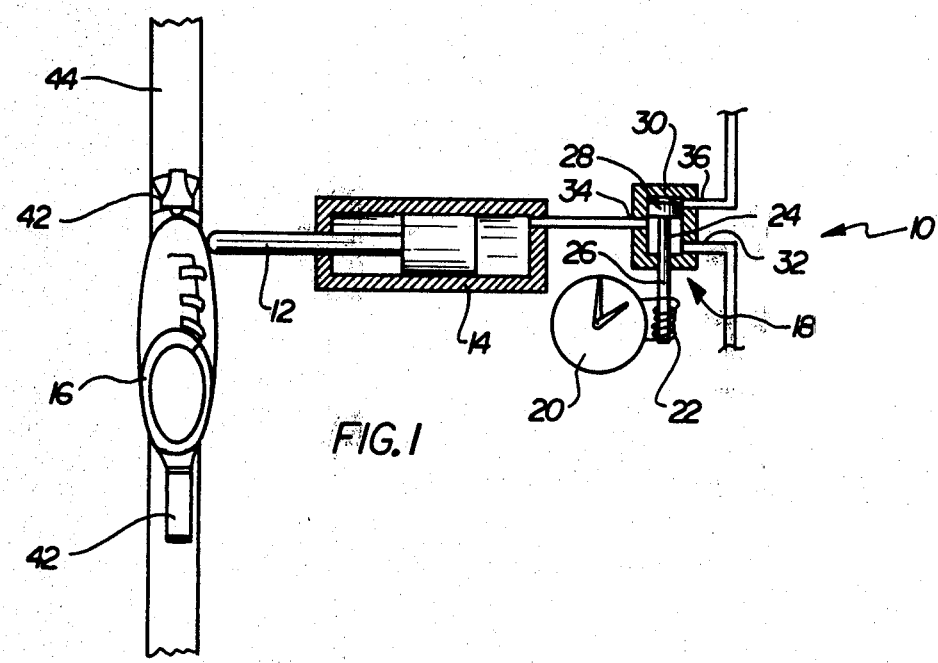

United States Patent [19]

Marker et al.

[11] 4,341,121

[45] Jul. 27, 1982

[54] METHOD AND APPARATUS FOR TESTING THE RESETTING CAPACITY OF SAFETY SKI BINDINGS WHICH ARE FOR EXAMPLE MOUNTED ON SKIS

[75] Inventors: Hannes Marker, Hauptstrasse 51-53, 8100 Garmisch-Partenkirchen, Fed. Rep. of Germany; Walter Knabel, Farchant; Gerhard Eichweber, Kochel, both of Fed. Rep. of Germany

[73] Assignee: Hannes Marker, Garmisch-Partenkirchen, Fed. Rep. of Germany

[21] Appl. No.: 201,110

[22] PCT Filed: Feb. 20, 1979

[86] PCT No.: PCT/EP79/00010

§ 371 Date: Oct. 22, 1979

§ 102(e) Date: Oct. 22, 1979

[87] PCT Pub. No.: WO79/00653

PCT Pub. Date: Sep. 6, 1979

[30] Foreign Application Priority Data

Feb. 22, 1978 [DE] Fed. Rep. of Germany ....... 2807638

[51] Int. Cl.$^3$ ............................................. G01L 5/03
[52] U.S. Cl. ................................................ 73/862.02
[58] Field of Search ........... 73/133 A, 862.01, 862.02, 73/161

[56] References Cited

U.S. PATENT DOCUMENTS 3,861,205  1/1975  Frey ................................. 73/133 A

FOREIGN PATENT DOCUMENTS 341399  2/1978  Austria .
394005  11/1965  Switzerland ..................... 73/133 A Primary Examiner—Charles A. Ruehl
Attorney, Agent, or Firm—Squire, Sanders & Dempsey

[57] ABSTRACT

Safety ski bindings offer an adequate safeguard against erroneous release if they possess an adequately large resetting capacity. To test this resetting capacity, the ski boot is repeatedly displaced through a constant distance by a pressure pin applying a constant force thereto during constant time intervals. If the ski boot fails to return to its starting position during constant time intervals against a fixed resistance, then this is indicative of an inadequately large resetting capacity because the residual distances remaining after each displacement will be summated and eventually cause release of the binding.

3 Claims, 2 Drawing Figures

METHOD AND APPARATUS FOR TESTING THE RESETTING CAPACITY OF SAFETY SKI BINDINGS WHICH ARE FOR EXAMPLE MOUNTED ON SKIS

Various constructions of apparatuses are known for testing and/or demonstrating the setting of safety ski bindings which are for example mounted on skis, by way of a ski boot held in the ski binding. In these apparatuses, the resisting force of the individual binding components which are to be released are detected during the releasing operation. In general, the maximum releasing force can be read off on a dynamometer with the aid of a drag pointer. It is also possible to exert on the binding large momentary shock-like forces of the kind occurring in practice.

A particularly revealing criterion for the assessment of safety ski bindings is also the size of its resetting capacity. However, this cannot be tested with the aid of presently marketed equipment.

It is therefore the object of the present invention to provide a method for testing the resetting capacity of safety ski bindings which are for example mounted on skis, by way of a ski boot held in the ski binding.

The method of the invention resides in that the ski boot is moved in the releasing direction through a constant distance by a constant force during constant time intervals and opposite to the releasing direction against a constant force during a respective constant intermediate period.

FIG. 1 illustrates schematically the apparatus of the present invention; and

Figure 2:
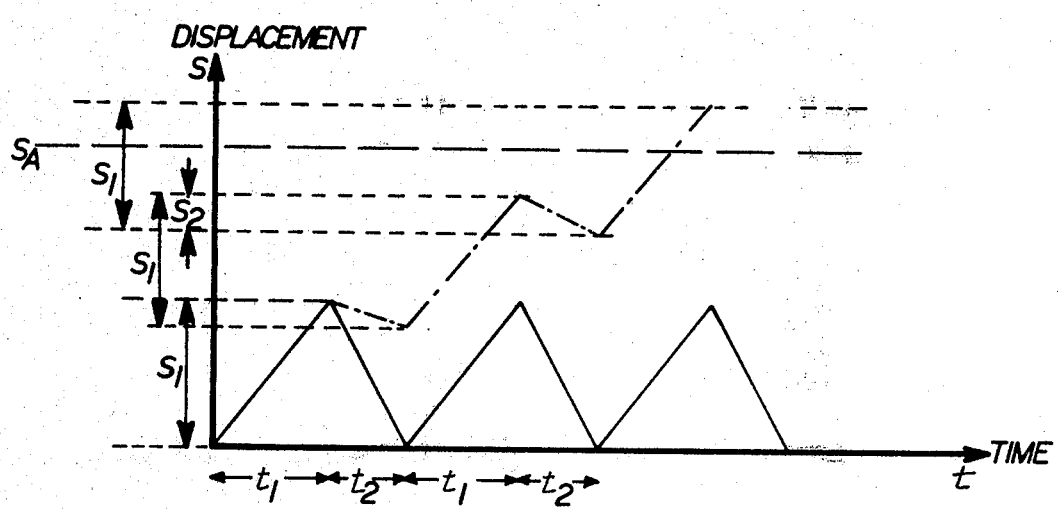

FIG. 2 portrays graphically the method of the present invention.

With an apparatus, generally designated 10, in which a pressure pin 12 or the like is mounted in a supporting member 14 for displacement in the releasing direction to apply a releasing load on the ski boot 16, it is suggested that for the purpose of performing the method of the invention the pressure pin be provided with a path giver, generally designated 18, which moves the pin 12 in the releasing direction and is under the influence of a clock 20 for turning it on and off, and that a resistance be built in which counteracts the resetting of the pressure pin 12 when the path giver 18 is switched off.

As clearly illustrated in FIG. 1, the path giver 18 is associated with clock 20 and a solenoid 22 actuated by the clock 20. The path giver 18 has a valve member 24 with a control rod 26 operatively associated with the solenoid 22. A control portion 28 of the valve member 24 is located within a housing 30. The housing 30 has an inlet 32 connected to a constant pressure source, a first outlet 34 connected to the supporting member 14, and a second outlet 36 for allowing escape of pressure from the housing 30 and support member 14. The control portion 28 is movable, by the solenoid 22, between first and second positions. In the first position, the pressure source is in fluid communication with the support member 14 so that the pin 12 is urged towards the boot 16 held in the binding 42 on the ski 44. In the second position, the support member 14 is in fluid communication with the second outlet 36 so that the pin 12 is forced into the support member by the force exerted on the boot by binding 42.

After a ski 44 provided with a safety ski binding 42 has been secured in the apparatus 10 and after a ski boot 16 has been placed in the binding 42, the apparatus 10 is ready for operation and can be switched on. Switching on of the clock 20 also causes the path giver 18 to be switched on, which applies a constant force to the pressure pin 12 in the releasing direction for a constant time interval, causing said pressure pin to move through a constant distance and carries the ski boot 16 along with it against the resistance of the binding component 42. After the predetermined constant distance has been traversed, the path giver 18 switches itself off and at the same time the resistance is switched on that opposes the resetting motion of the pressure pin 12, for instance, the resistance to fluid flow provided by the fluid flow path from support member 14, through outlet 34, through housing 30, and through the second outlet 36. The spring force stored during the releasing motion of the binding component 42 now causes the binding component to return and carry with it the ski boot 16 which acts against the pressure pin 12. This takes place during the constant intermediate period. After expiry of this period, the clock 20 will again switch the path giver 18 on.

The resetting capacity of the safety ski binding will be adequately large if the releasing binding component returns to its starting position during the said intermediate period on the basis of a resistance which has proved to be correct during practical skiing. This relationship is schematically illustrated by the solid line graph in FIG. 2. During the time period $t_1$, the support member 14 is in fluid communication with the inlet 32, while during time period $t_2$, the support member 14 is in fluid communication with the outlet 36. However, if the resetting capacity is not adequately large, the residual distances remaining after each shock will be summated and eventually lead to release, as illustrated by the dashed line in FIG. 2, of the binding, which is in this case to be regarded as an erroneous release.

We claim:

1. A method of testing the resetting capacity of a safety ski binding mounted on a support, comprising:
    positioning a member in a rest position in the ski binding;
    exerting a first constant force on the member in a release direction of the binding during constant time intervals; and
    releasing the first force during time periods intermediate the constant time intervals so that the member is moved towards its rest position by the ski binding against a second constant force, the member returning to its rest position during the time periods when the resetting capacity of the safety ski binding is more than a predetermined value, and the member returning only a part of the way to its rest position when the resetting capacity of the safety ski binding is less than the predetermined value so that a residual distance remains at the end of each time period, the residual distances being summated during subsequent exertions of the first force to cause release of the safety ski binding.

2. A method according to claim 1, wherein the support is a ski and the member is a ski boot.

3. An apparatus for testing the resetting capacity of a safety ski binding mounted on a support, the ski binding holding a member in a rest position, said apparatus comprising:
    supporting means spaced from the support;
    a pin mounted in the supporting means for movement towards and away from the member held in the ski binding;

means for moving the pin into engagement with the member to thereby exert a releasing force on the ski binding;

resistance means for applying a constant force counteracting movement of the pin when the ski binding urges the member towards its rest position; and clock means for controlling said means for moving for spaced time intervals so that, during the time intervals, said means for moving exerts a first constant force on said pin to thereby move the member held by the ski binding and exert a releasing force on the ski binding, said ski binding urging the member against the resistance means towards its rest position during time periods intermediate the time intervals, the member returning to its rest position during the time periods when the resetting capacity of the safety ski binding is more than a predetermined value, and the member returning only a part of the way to its rest position when the resetting capacity of the safety ski binding is less than the predetermined value so that a residual distance remains at the end of each time period, the residual distances being summated during subsequent exertions of the first force to cause release of the safety ski binding.

* * * * *